US012802960B2

(12) United States Patent
Böhm et al.

(10) Patent No.: US 12,802,960 B2
(45) Date of Patent: Nov. 17, 2026

(54) DEVICE AND METHOD FOR THE SPECTROMETRIC ANALYSIS OF SAMPLE MATERIAL

(71) Applicant: Bruker Daltonics GmbH & Co. KG, Bremen (DE)

(72) Inventors: Sebastian Böhm, Bremen (DE); Andreas Haase, Bremen (DE)

( * ) Notice: Subject to any disclaimer, the term of this patent is extended or adjusted under 35 U.S.C. 154(b) by 302 days.

(21) Appl. No.: 18/634,324

(22) Filed: Apr. 12, 2024

(65) Prior Publication Data

US 2024/0355610 A1 Oct. 24, 2024

(30) Foreign Application Priority Data

Apr. 20, 2023 (DE) ........................ 102023110079-3

(51) Int. Cl.

| | |
|---|---|
| ***H01J 49/40*** | (2006.01) |
| ***H01J 49/00*** | (2006.01) |
| ***H01J 49/04*** | (2006.01) |
| ***H01J 49/16*** | (2006.01) |

(52) U.S. Cl.

CPC ........ *H01J 49/403* (2013.01); *H01J 49/0004* (2013.01); *H01J 49/0418* (2013.01); *H01J 49/164* (2013.01); *H01J 49/405* (2013.01)

(58) Field of Classification Search

None

See application file for complete search history.

(56) References Cited

U.S. PATENT DOCUMENTS

| | | | | |
|---|---|---|---|---|
| 5,886,345 | A | 3/1999 | Köster et al. | |
| 8,872,103 | B2 | 10/2014 | Holle et al. | |
| 2008/0191131 | A1 * | 8/2008 | Hohndorf | H01J 49/0409 250/283 |
| 2016/0064202 | A1 | 3/2016 | VanGordon et al. | |
| 2023/0145540 | A1 | 5/2023 | Haase et al. | |
| 2024/0079226 | A1 * | 3/2024 | Chaudhuri | H01J 49/40 |

FOREIGN PATENT DOCUMENTS

| | | | |
|---|---|---|---|
| DE | 19635646 | | 12/1997 |
| DE | 19633507 | | 1/1998 |
| DE | 102011112649 | A1 | 3/2013 |
| DE | 102021128848 | A1 | 5/2023 |

* cited by examiner

*Primary Examiner* — Eliza W Osenbaugh-Stewart

(74) *Attorney, Agent, or Firm* — DECODE Legal Inc.

(57) ABSTRACT

The disclosure relates to devices and methods for the spectrometric analysis of sample material located on a sample support, and in particular on a flat sample support plate, using axial time-of-flight analysis. One operating mode of the devices and methods comprises an adjustment of the pulse focal position for the abrupt ablation and/or abrupt desorption of sample material in a z-direction that is perpendicular to a tangential plane at the location of ablation and/or desorption at the sample support, and the selection of a suitable setting for an acceleration with time lag of the ablated and/or desorbed and ionized sample material onto a flight path. It can be particularly advantageous to use these devices and methods in mass spectrometry imaging (MSI). The devices and methods can, in particular, be used with laser desorption/ionization (LDI) and specifically matrix-assisted laser desorption/ionization (MALDI).

11 Claims, 4 Drawing Sheets

DEVICE AND METHOD FOR THE SPECTROMETRIC ANALYSIS OF SAMPLE MATERIAL

FIELD OF THE INVENTION

The disclosure relates to devices and methods for the spectrometric analysis of sample material positioned on a sample support, and in particular on a flat sample support plate. It can be especially advantageous to use the devices and methods in mass spectrometry imaging (MSI). The devices and methods can, in particular, be used with laser desorption/ionization (LDI) and specifically matrix-assisted laser desorption/ionization (MALDI).

BACKGROUND TO THE INVENTION

The Prior Art is explained below with reference to a specific aspect. This is not to be understood as a limitation, however. Useful further developments and modifications of what is known from the Prior Art can also be applied above and beyond the comparatively narrow scope of this introduction, and will easily be evident to practitioners skilled in the art in this field after reading the following disclosure.

In axial time-of-flight mass analyzers, the quality, evaluability and informational value of the recorded spectral data depends to a significant extent on knowledge of the flight paths and, consequently, on the position of the sample material. In this context, "axial" means that the ions for analysis are generated using a local, pulsed input of energy into the sample material, e.g. using a laser pulse, before being accelerated directly onto an axis of the flight path using potential gradients. This acceleration with time lag is also referred to as delayed extraction or pulsed ion extraction. The flight path axis can be linear or, if for example there is a reflector positioned along the flight path, it can be curved. The flight path, which ends at the detector, and the time of flight depend on the distance between the position of the ionized sample material at the time of acceleration, which is essentially determined by the position of the prepared sample material, and the position of the nearest extraction electrode.

The position of the sample material along the flight path axis influences the resolving power of the mass analyzer. The sample material is usually placed on flat sample supports whose surface is made conductive to enable the formation of an electrical reference potential in relation to the nearest extraction electrode. Height differences in the sample material on such a support, e.g. across a microtomized tissue section or across a field of scattered dried sample points, may be in the range of a few micrometers. These variations inherent in the sample material may be superimposed with locational inaccuracies caused by the shape and position of the support plate. The flatness and surface accuracy of frequently used sample supports may vary by up to ±50 micrometers. There may also be positional inaccuracies caused when the sample support is fixed in the corresponding ion source holder. Tilting is one example of this.

Delayed extraction improves the mass resolution due to the correlation between the velocity and the position of the ions once these have been generated, based on the fact that charged particles are only very rarely considered in isolation, but rather each ionic species comprises a plurality of charged particles of the same species. The charged particles of an ionic species that are generated with greater kinetic energy in an abrupt desorption process have a higher velocity and move closer to the extraction electrode during the time lag before the application of the acceleration potential or a potential profile that varies over time. The slower charged particles in the same ionic species with a lower amount of kinetic energy stay at a greater distance from the extraction electrode when the acceleration potential or the potential profile is applied, and therefore receive more additional kinetic energy compared to the particles in the ionic species that are located closer to the extraction electrode. When setting the correct time lag and selecting a suitable amplitude and edge steepness of the extraction pulse in relation to the flight path, the slower charged particles in the ionic species receive sufficient additional kinetic energy to catch up with the faster charged particles in the ionic species in flight after they have traveled a certain distance from an extraction module. The ionization area can be set up such that charged particles with the same mass-to-charge ratio (m/z) fly to the detector via the flight path in the same time frame.

A number of Prior Art documents that may be viewed as technological background to the present disclosure is set out in the following list, which does not claim to be exhaustive:

The study by M. L. Vestal et al. (Rapid Communications In Mass Spectrometry, Vol. 9, 1044-1050 (1995)) describes a mass spectrometer system with MALDI ionization and delayed extraction, which is designed to offer improved performance compared to identical time-of-flight analyzers that are operated with constant electric fields. This work introduced the term "delayed extraction", which has been used regularly since then.

The patent specification DE 196 38 577 C1 (corresponding to U.S. Pat. No. 5,969,348 A) relates to measurement methods for time-of-flight mass spectrometers that operate with ionization of superficially adsorbed analyte substances and with an improvement in the mass resolution by means of a time-delayed start of ion acceleration ("delayed extraction") in the space in front of the sample support. In particular, it addresses velocity focusing for simultaneously good mass resolutions for all masses of the spectrum. The disclosure consists in focusing the times of flight of the ions simultaneously for all masses in relation to their initial velocity by allowing the acceleration to continuously increase over time in the first acceleration region directly after switch-on.

The patent specification DE 196 33 441 C1 (corresponding to U.S. Pat. No. 5,910,656 A) relates to the precise mass determination of analyte ions in high-resolution time-of-flight mass spectrometers, where the ions are generated by ionization of the analyte substances on a sample support, using MALDI, for example, and particularly methods and devices for keeping calibrated mass scales constant using internal reference substances. The disclosure consists in adjusting the distance between the sample support and the nearest accelerating electrode, which has a particularly critical impact on the calibration of the mass scale, using space-adjusting actuators in a way that precisely regulates the time of flight of the ions of a reference substance, which is determined by the calibration. Under certain conditions, the matrix substance of the MALDI method can serve as the reference substance. This adjustment of the distance means that a calibration of the relationship between the time of flight and the mass (i.e. the mass scale) that is performed once can be permanently maintained. This has a particularly advantageous effect when the start of the ion acceleration is temporally delayed in order to improve the mass resolution.

The patent publication WO 2004/079771 A2 describes a device and a method for measuring the chemical composition and three-dimensional structure of chemical and biological samples, evaluating the measured data, and then graphically displaying this data. It reports that using an optimized ion source makes it possible to generate a dependence of the time of flight or kinetic energy on the formation location of the ions in the z-direction that is greater than the dependence of the times of flight or kinetic energies on the initial energy distributions. This is designed to make it possible to determine all three spatial directions (Cartesian coordinates x, y, and z) of an ion's location of origin. The evaluation method is also designed to make it possible to transform this locational information into graphical representations.

The patent publication DE 10 2007 006 933 A1 (corresponding to US 2008/0191131 A1) relates to the precise determination of the mass and quantity of analyte ions in high-resolution time-of-flight mass spectrometers in which the analyte ions are generated by the ionization of a sample containing analyte substances, which is located together with a plurality of other samples on a movable sample support. The sample can be ionized by MALDI, for example. The disclosure consists in recording the spacing between the sample surface and a first acceleration diaphragm in the ion source, which is critical for determining the mass and quantity of the ions, by analyzing the images from a video camera directed at the sample, and adjusting this spacing. The adjustment can be done by means of electromechanical actuators, for example. The image analysis can be simplified by projecting a light pattern onto the sample surface at an angle.

The patent publication EP 3 306 639 A1 describes a device and a method for measuring and analyzing the chemical composition and the three-dimensional structure of sample surfaces. The same authors have also published a study that explains autofocusing MALDI mass spectrometry imaging of tissue sections and chemical 3D topography of irregular surfaces (Kompauer, M., Heiles, S. & Spengler, B., *Nat Methods* 14, 1156-1158 (2017)).

The study by Benjamin Bartels et al. (RSC Adv., 2017, 7, 9045) deals with the mapping of metabolites from jagged sample material using laser ablation electrospray ionization on non-flat samples.

The study by Brian J. Malys et al. (J. Am. Soc. Mass Spectrom. (2018) 29, 422-434) deals with the diagnosis and correction of mass accuracy and signal intensity errors caused by initial ion position variations in a MALDI-TOF MS.

The work by Michelle Piotrowski et al. (J. Am. Soc. Mass Spectrom. (2019) 30, 489-500) discusses a method for determining the position of ion generation in a MALDI-TOF MS by analyzing the laser image on the sample surface.

The patent publication WO 2024/041681 A1 relates to a device for multimodal analysis of sample material, e.g. from tissue, which records molecule image information from the sample material with spatial resolution, e.g. using a MALDI time-of-flight mass analyzer, and also records microscopy image information from sample material with spatial resolution, and links both pieces of information together to give spatially resolved co-registered overall image information with improved accuracy.

There is therefore a need for the expansion and improvement of methods and devices for axial time-of-flight analysis in mass spectrometry. Further objectives that can be achieved by the invention will be immediately apparent to the person skilled in the art from reading the disclosure below.

SUMMARY OF THE INVENTION

The disclosure relates to a device for the spectrometric analysis of sample material located on a sample support, comprising: —an axial time-of-flight analyzer with a flight path emanating from the sample support, —an ionization device that is arranged and designed to locally impact sample material on the sample support using ablation and/or desorption pulses, to ionize locally ablated and/or desorbed sample material, and to adapt a pulse focal position along a z-direction that is substantially perpendicular to a tangential plane on an impingement point of an ablation and/or desorption pulse at the sample support, as a function of a sample material location in the z-direction, preferably without moving the sample support, —an extraction device that is arranged and designed to accelerate ionized sample material onto the flight path with a time lag, where the acceleration with time lag is coordinated with an ablation and/or desorption pulse and is performed using a setting that can be selected from a plurality of different settings that are designed for a plurality of predetermined sample material locations in the z-direction, —a probing device that is arranged and designed to determine a sample material location in the z-direction for an impingement point of an upcoming ablation and/or desorption pulse, and a control and/or guidance system that communicates with the axial time-of-flight analyzer, the ionization device, the extraction device and the probing device and that is arranged and designed to control the extraction device in such a way that the determined sample material location in the z-direction is used to select the setting for the acceleration with time lag that follows the upcoming ablation and/or desorption pulse.

Instead of controlling the movement mechanism of the sample support in order to compensate for variations in the sample material location in the z-direction, as has already been described in the Prior Art, the inventors have recognized that the ion source control can be accelerated if the movement of the sample support, which is a laborious process due to the large masses being moved, and which may also require waiting until an attenuation period has elapsed in order to allow the vibrations resulting from the movement to subside, can be avoided by adapting the pulse focal position in the z-direction to the sample material location in this direction. The actuators required for this respond more quickly due to the lower masses being moved, and adapt the pulse focal position more quickly. The pulse focal position is usually the location of the lowest lateral spatial spread of the pulse. With a pulsed beam, the term "beam waist" is also used.

The pulse focal position will preferably match the location of the sample material in order to achieve the best possible energy input into the sample material for the ablation and/or desorption pulse. This ensures that the ionization yield resulting from the ablation and/or desorption pulse is optimal. This measure promotes both the constancy of the detected signal intensity and the detection efficiency. In the case of measurements taken over longer periods, the adaptation of the pulse focal position also helps to maintain uniform ablation and/or desorption conditions, e.g. with the spatial scanning of a tissue section.

Axial time-of-flight analyzers can measure all ionic species m/z simultaneously and can be operated with a measuring rate in the kilohertz range. Depending on the set-up of the time-of-flight analyzer, the mass resolving power $R=M/\Delta M$ can be in the range of several 10,000, and it is possible to keep R at a constantly high level over a wide mass range. This kind of setting makes it possible to separate isobars of ionic species and to determine chemical empirical formulas of analytes in sample material. The relative mass accuracy ΔM/M of a time-of-flight analyzer can be kept in the low ppm range.

The ablation and/or desorption pulse applied can have electromagnetic waves. The ablation and/or desorption pulse may have coherent light, e.g. laser light. The ablation and/or desorption pulse may strike the sample material on the sample support in incident light (in reflection mode) or transmitted light (in transmission mode). The ablation and/or desorption pulse may comprise a pulse profile with a single intensity peak or a pattern of intensity peaks. Models for such designs can be found in patent publications DE 10 2004 044 196 A1 (corresponds to US 2006/0071160 A1), DE 10 2005 006 125 A1 (corresponds to US 2006/0186332 A1) and DE 10 2013 018 496 A1 (corresponds to US 2015/0122986 A1) of the applicant which are incorporated herein by reference in their entireties. The ablation and/or desorption pulse may have a Gaussian or Flat Top profile. The sample material may be exposed to a pulse sequence with a clock-pulse rate in the range of a few hertz, e.g. 1-20 pulses per second, up to $10^3$ or $10^4$ hertz. Clock-pulse rates of over $10^4$ hertz, e.g. 20 kilohertz, are also fundamentally possible, e.g. when measuring certain mass ranges. Repeated ablation and/or desorption events from the same location of the sample material on the sample support may be used to form sum spectral information from this location, i.e. to merge the spectral information recorded in individual mass-analytical scans from this location into a single spectral dataset. Alternatively, ablation and/or desorption is also possible "in reflection mode" as a form of secondary ion mass spectrometry (SIMS) with primary ion bombardment.

The sample material on the sample support may comprise an individualized single cell, which may be of human or animal origin, for example. In particular, the single cell may be grown directly on the sample support, e.g. by in-situ cultivation, or deposited there. The single cell may be a tissue cell. The single cell may be taxonomically classified as a prokaryote, e.g. a cell of a bacterial or archaeal species, or eukaryote, e.g. a human, animal, plant, fungal or algal cell. The sample material may also comprise a tissue section that has been prepared from a frozen block or as an FFPE-prepared block, for example, using a technique such as microtomy. A spot preparation, which is also a possibility, may in particular comprise a dried liquid or reagent spot containing sample material, e.g. in the form of analyte molecules.

The sample material may be prepared with a light-absorbing matrix substance. For the ablation and/or desorption, MALDI methods in incident light (in reflection mode) or in transmitted light (in transmission mode) may be used, depending on the requirement. The MALDI method requires a certain sample preparation with a light-absorbent matrix substance, e.g. sinapic acid, 2.5-dihydroxybenzoic acid, α-cyano-4-hydroxycinnamic acid or 2.5-dihydroxyacetophenone, all of which absorb strongly in the ultraviolet spectral range. Laser light from a nitrogen laser with a wavelength of around 337 nanometers or from a frequency-tripled solid-state Nd:YAG laser at around 355 nanometers, for example, is suitable for the ablation and/or desorption pulse. The energy of the ablation and/or desorption pulse is preferably in the range of 1-10,000 nanojoules; the lower limit can be applied particularly in the case of small laser foci on the sample material, as can be set with transmission-mode MALDI, for example. Ablation and/or desorption can be supplemented by a post-ionization modality. It shall be understood that the setting of the post-ionization modality must, if necessary, be adapted to the modified pulse focal position in the z-direction, e.g. in order to ensure an optimal impact on the ablation or desorption cloud.

The sample support may have a plate design, e.g. a flat sample support plate. The sample support may have the dimensions of a standard microtitration plate, e.g. 127.71 millimeters long, 85.43 millimeters wide and 14.10 millimeters thick. The material of the sample support may be conductive, e.g. made of steel; it may also have a glass, ceramic or plastic substrate with a conductive surface coating that carries the sample material. One example of the latter is indium tin oxide-coated specimen slides (ITO).

The probing device may comprise a non-mass-analytical imaging modality. The imaging modality may be non-sample consuming. The imaging modality may comprise microscopic images of the side of the sample support carrying the sample material. Bright-field microscopy, dark-field microscopy, infrared microscopy, near-field microscopy, phase-contrast microscopy and/or polarization microscopy may be used. The microscopic image may be captured uniformly from the entire sample support or piece by piece by capturing small image elements, which can then be combined using image processing algorithms to form an overall image of the sample material or sample support. Focus stacking methods may be used, as suggested in the patent document WO 2024/041681 A1 which is incorporated herein by reference in its entirety. Preferably, an image of an imaging modality is taken from the sample material or sample support prior to the application of ablation and/or desorption pulses. An example of probing of the sample material location in the z-direction, which is derived from an xy offset of a light spot or pattern projected onto the sample material or sample support at an angle using a video camera, is published in the applicant's patent publication DE 10 2007 006 933 A1 cited in the introduction, which is incorporated herein by reference in its entirety.

The pulse focal position can be modified in the z-direction by means of suitably controllable and movable actuators. If a laser pulse is being applied, this type of actuator may comprise a movable imaging lens in the beam path of the laser pulse, for example. Changing the object distance makes it possible to modify the image plane of the laser pulse focus in the z-direction. It is preferable for the imaging lens to be optimized to the wavelength of the laser light, e.g. in the ultraviolet spectral range such as 337 nanometers or 355 nanometers. Instead of using a single lens, it is also possible to use a more complex lens system, e.g. an achromatic lens, an objective lens, or a zoom lens.

The flight path of the time-of-flight analyzer may end at a detector and is usually designed such that it is largely free from electrical potentials (with the exception of reflector setups). The detector may consist of an assembly that operates on the principle of secondary-electron multiplication. The detector may, in particular, have a multichannel plate (also known as a microchannel plate), e.g. in a chevron arrangement, or a row of dynodes. As part of the secondary electron multiplication, it is possible for secondary electrons to be converted to photons and then back to secondary electrons again, e.g. in order to decouple the signal from a vacuum region of the detector via a transparent window. The incoming ion current at the detector may be recorded in a spectral dataset. A spectral dataset may comprise a frequency distribution of detected ionic species as a function of a mass parameter m or mass-related parameters such as the time of flight prior to conversion or the mass-to-charge ratio m/z. A spectral dataset may be a spectrum, but after suitable post-processing, may also be a list of detected signals above ubiquitous noise (peak list). Depending on the analysis setup, a spectral dataset may contain information about the circumstances of data acquisition in the metadata, e.g. the setting used for the acceleration with time lag or the pulse focal position in the z-direction detected by the probing device.

The extraction device may comprise a plurality of diaphragm electrodes arranged in series, a first one of which is located opposite the sample support, and to which different electrical potentials can be applied. An example of the arrangement of an extraction device can be found in the applicant's patent publication DE 10 2018 112 538 B3 (corresponding to US 2019/0362958 A1) which is incorporated herein by reference in its entirety. For the extraction of ions, an electrical potential gradient can be applied such that the potential is changed at the first extraction electrode or at the sample support surface. It is preferable for the potential to be kept constant at the sample support for handling reasons, and for the first extraction electrode to be switched after a predetermined time lag after the ablation and/or desorption pulse. The applied potential for the delayed extraction may be temporally variable, e.g. as explained in the patent specification DE 196 38 577 C1 (corresponding to U.S. Pat. No. 5,969,348 A) mentioned in the introduction, which is incorporated herein by reference in its entirety. It is possible to vary the pulsed extraction potential by means of an exponential function with asymptomatic limit value, e.g. according to $$U_1 = V_1 + \left\{1 - \exp\left(\frac{t-\tau}{t_1}\right)\right\}$$

for $\tau>0$, where the acceleration potential $U_1$ at time $\tau=0$ with the base potential $V_1$ starts to increase and approaches the limit value $(V_1+W_1)$ with the asymptomatic constant $t_1$. The time between the ablation and/or desorption pulse and the time $\tau=0$ corresponds to the time lag and may be in the range of two-digit to three-digit nanoseconds with vacuum conditions of at least around $10^{-4}$ pascal, and in particular at least around $10^{-5}$ pascal, to which the ionization area of an axial time-of-flight analyzer is usually evacuated.

In various embodiments, the plurality of settings may comprise a corresponding plurality of time lags for the acceleration with time lag. The plurality of time lags may be allocated to discrete sample material locations in the z-direction in a reference table. The plurality of time lags may be recorded in a nanosecond grid containing intervals that are selected from among a group including or consisting of: eight nanoseconds, six nanoseconds, four nanoseconds, two nanoseconds, one nanosecond, or another integer of between 1 and 10 nanoseconds. If the predetermined settings do not contain all possible pulse focal positions and corresponding time lags, it is possible for the control and/or guidance system, or a processing unit connected to it, to be equipped with an algorithm that performs interpolation, extrapolation or regression based on the available settings in order to derive non-predetermined settings, e.g. in real time depending on the requirement.

In various embodiments, the plurality of settings can be parameterized as a function of the determined sample material location in the z-direction by means of an equation. The equation can be parameterized linearly, according to: Time lag $\tau$ (height h)=a*h+b, where h is a relative reference sample material location in the z-direction at the ablation and/or desorption location, and a and b are constants of a regression from calibration data. The reference sample material location may, in particular, indicate a standard location between the surface of the sample support and the first extraction electrode, e.g. derived from a normalized thickness of a standard sample support such as a ground steel plate or an indium tin oxide-coated glass specimen slide. The parameterization shown above by way of example is linear. It is, of course, also possible to provide for parameterization with higher-order proportionality constants, e.g. including quadratic and/or cubic terms etc.

In various embodiments, the control and/or guidance system can be arranged and designed to convert times of flight to masses m or mass-related values, e.g. m/z, using time-of-flight correction values, which can be selected from a plurality of time-of-flight correction values designed for a plurality of predetermined sample material locations in the z-direction. In the case of MALDI ionization, the charge number of the generated ions is usually z=1. A time-of-flight correction value may be selected for the conversion using the determined sample material location in the z-direction. A time-of-flight correction function that outputs corrected times of flight may be parameterized according to:

$$t_{ref}(t', h) = \frac{t' - c_0(h)}{c_1(h) + 1},$$

where $t_{ref}$ is the corrected time of flight, t' is the measured time of flight with a sample material location in the z-direction that deviates from h=0, and $c_0$ and $c_1$ are constants of a regression from calibration data. Alternatively, it is possible to provide separate mass calibrations for a plurality of sample material locations in the z-direction, of which those calibrations that best correspond to the determined z-position are selected and applied for converting times of flight to masses.

In various embodiments, the time-of-flight analyzer may be arranged and designed with a rectilinear flight path or curved flight path, e.g. using at least one reflector. A rectilinear flight path guarantees the greatest possible ion detection sensitivity, since it is scarcely possible for ionic species to be lost in flight. Conversely, a reflector on the flight path, comprising a stack of diaphragm electrodes arranged in series onto which different electrical potentials are applied, can reduce the fluctuation of the times of flight of ionic species with the same mass-to-charge ratio m/z, which is caused by the fluctuation of the kinetic energy of this ionic species in the extraction module.

In various embodiments, the ionization device can be arranged and designed to impact the sample material in transmission mode through the sample support, or in reflection mode with ablation and/or desorption pulses. An embodiment in reflection mode has the advantage that it allows the use of a sample support that is not translucent or transparent, e.g. a polished steel plate. An embodiment in transmission mode has the advantage that pulse-focus-forming elements can be positioned very close, directly behind the sample support so that very small pulse foci can be set, e.g. in the low micrometer range or even the sub-micrometer range. The latter allows very high lateral spatial resolutions, e.g. in the imaging mass analysis of tissue sections.

The control and/or guidance system may be a computer, processor or other data processing and control unit that is able to receive, process, and transmit data and to output commands derived from this data. The control and/or guidance system may be organized centrally or locally. Local organization may mean that different modules of the device, some of which may be spatially separated from each other, are equipped with circuits or processing units that communicate and exchange data with other modules.

The disclosure also relates to a method for the spectrometric analysis of sample material located on a sample support by means of a device as explained above.

BRIEF DESCRIPTION OF THE DRAWINGS

The invention can be better understood by referring to the following illustrations. The elements in the illustrations are not necessarily to scale, but are primarily intended to illustrate the principles of the invention (mostly schematically). In the illustrations, the same reference numbers designate corresponding elements in the different views.

DETAILED DESCRIPTION

While the invention has been illustrated and explained with reference to a number of embodiments, those skilled in the art will recognize that various modifications in form and detail can be made without departing from the scope of the technical teaching, as defined in the attached claims.

Figure 1:
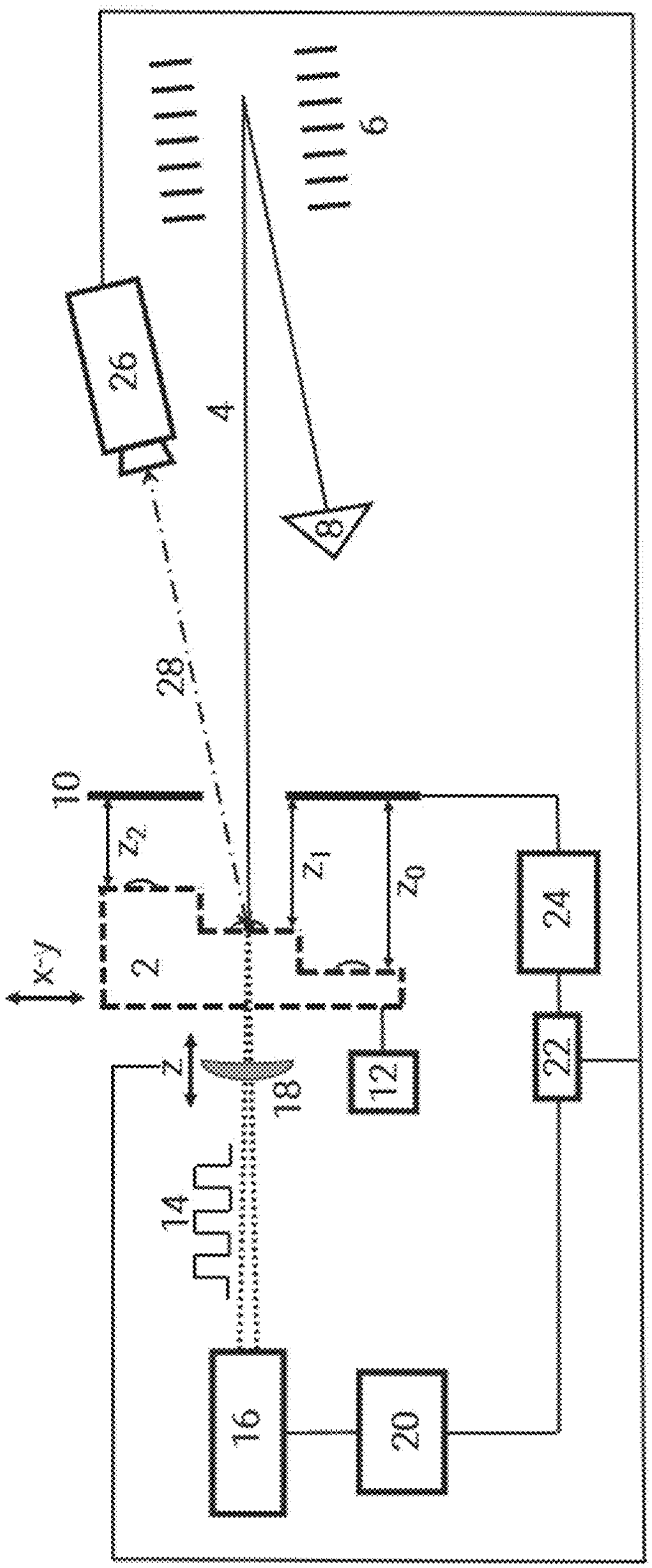
FIG. 1 is a schematic representation of an arrangement of a device for the spectrometric analysis of sample material located on a sample support, in accordance with principles of the present disclosure (transmission mode arrangement).

FIG. 1 shows a first arrangement of a device for the spectrometric analysis of sample material located on a sample support (2), and depicts, in particular, how a sample material location in a z-direction can be detected and how a pulse focal position can be adapted to the detected sample material location in the z-direction in order to bring about optimal ablation and/or desorption.

It shows an axial time-of-flight analyzer with an ionization device from which ionized sample material is pulsed, with a time lag, onto a flight path (4) that is deflected by a reflector (6) and therefore exhibits a non-rectilinear course before ending at a detector (8). The ion formation area is located between a sample support (2), on which the sample material has been deposited, and an extraction electrode (10) with a central aperture, which can, by means of a control and/or guidance system, be pulsed onto an electrical potential that attracts the ablated and/or desorbed and ionized sample material. The single extraction electrode (10) may also take the form of a more complex extraction electrode system. For illustrative purposes, the sample support (2) is depicted as having a stepped design, which means that there are always different sample material locations in a z-direction that corresponds to an ion extraction direction and that is preferably parallel to a surface normal of the sample support at the ablation or desorption location, even if other influencing variables, such as the sample material thickness or the fixation of the sample support (2) in a translation stage (not shown), are ideal. This type of stepped sample support (2) can, for example, be used for calibrating the settings of both the acceleration with time lag and the time-of-flight correction. Alternatively, a flat sample support held in a translation stage with a means of adjustment in the z-direction may be used for this type of calibration. The sample support (2) is at least partially conductive and is connected to a potential supply, e.g. a voltage source (12), in order to receive an electrical reference potential.

The translation stage (not shown) to which the sample support (2) is coupled can be moved in an xy-plane in steps that go down to a few micrometers. A means of adjustment in the z-direction is optional, but not necessary within the context of the present disclosure. The dashed outline of the sample support (2) indicates that it is transparent for electromagnetic waves in order to allow the application of ablation and/or desorption pulses (14) in transmission mode. The sample support may, for example be depicted as an ITO glass specimen slide. The pulses (14) can be delivered using a laser (16), e.g. a nitrogen gas laser or Nd:YAG laser with frequency multiplication to the ultraviolet spectral range. An imaging lens (18) or a lens system in the beam path can be moved along the z-direction using a suitable mechanism, thereby adjusting the object distance and the image plane so that a pulse focus can be set to different points along the z-axis. A control and/or guidance system can be organized centrally in a single computer or locally using different circuits or processors coupled together. The control and/or guidance system in the present disclosure comprises a trigger generator (20) for the temporally coordinated release of laser pulses, a delay generator (22) and an electronic circuit (24) for generating an electrical extraction pulse, which can also take the form of a temporally varying potential profile, for example in order to take account of the acceleration behavior of ionic species with different masses.

Along the flight path (4) beyond the extraction electrode (10), there is a lateral probing device (26) in the form of a combined image generation and capture system that can project predetermined light patterns onto the sample support in incident light at a predetermined angle, and depict the surface of the sample support carrying the sample material along the same optical axis (28). Although not shown in the illustration, it is also possible for the axis of the projected light pattern and the observation axis to be located opposite each other, on different sides of the extraction axis, so that the angle of incidence of the light corresponds to the angle of reflection of the observation axis. The light pattern may comprise, for example, a light spot or a row of light bars that are imaged onto the sample support (2) at the location of an upcoming ablation and/or desorption, which is preferably located on the extraction axis. The image capture system may have a video camera with upstream imaging optical system which can be used to localize the light pattern on the sample material or sample support (2) and whose lateral displacement from a reference position in an xy-plane, arising from the oblique incidence of the light pattern projection, makes it possible to determine the sample material location in the z-direction. This type of method allows location differences along the z-direction to be detected in the range of a few micrometers, e.g. between around 5 and 10 micrometers.

A possible operational sequence can look like this: the translation stage (not shown) moves the sample support (2) to a certain position in the xy-plane so that a certain part of the sample material lies on the extraction axis. In the present example, it may be, as shown, the reference position $z_1$, which reflects a central position between the sample support surface and the extraction electrode (10), compared to the reference positions $z_0$ and $z_2$. The imaging system throws a light pattern onto the location where the sample material should be if it is correctly located in the z-direction. If this is the case, e.g. because the image capture system does not detect any lateral displacement of the projected light pattern, the pulse focal position does not need to be adapted, and the laser pulse (14) for ablation and/or desorption (including ionization where applicable, e.g. with MALDI) and the delayed downstream electrical extraction pulse can be triggered by the trigger generator (20) or the delay generator (22) without any further changes. If, however, a lateral displacement of the light pattern is detected, as is for example the case on the stepped sample support (2) with spacings $z_0$ and $z_2$ compared to $z_1$, an adaptation command is generated and transmitted to the movement mechanism of the imaging lens (18) in the beam path of the laser, so that the lens (18), which may be part of a more complex lens system, is moved to a position and the pulse focal position adapted such that the area of the lowest lateral spread of the pulse (14) in the z-direction is preferably at the location of the determined sample material location in the z-direction.

At the same time, the sample material location in the z-direction is instantaneously transmitted to the delay generator (22), which then selects a setting for acceleration with time lag that best corresponds to the determined sample material location. This can be done by selecting the most closely matching time lag value from a reference table in the control and/guidance system's memory. Alternatively, a time lag can also be calculated in real time from the reference points set out in a reference table, e.g. by interpolation, extrapolation, or regression. Alternatively, the dependency of the time lags on the sample material location in the z-direction can be stored as an equation in a control and/or guidance system processor and used to derive the required time lag after applying or entering the determined sample material location in the z-direction. When the adjustment of the pulse focal position is complete and the corresponding setting for the acceleration with time lag has been set up in the circuit (24) for applying the extraction potential, the laser pulse (14) and the electrical extraction pulse that follows with a time lag can be triggered. As explained above, the extraction pulse may be temporally variable, for example in order to take account of the acceleration behavior of ionic species with different masses.

Figure 2:
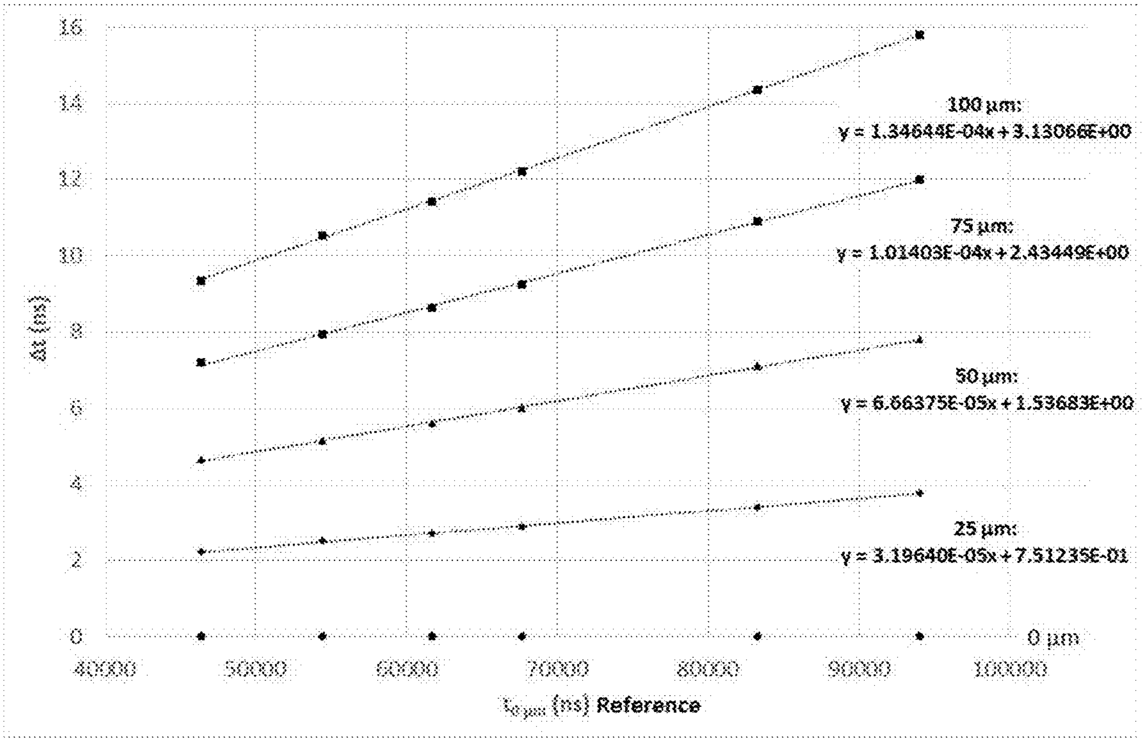
FIG. 2 illustrates time-of-flight correction values as a function of the measured time of flight for different sample material locations in the z-direction.

In order to take into account the varying sample material location in the z-direction also when converting times of flight to mass units or mass-related units such as m/z, a plurality of corresponding time-of-flight correction values for various sample material locations in the z-direction may be saved for retrieval in the control and/or guidance system. When the sample material location in the z-direction has been determined, the control and/or guidance system may process the spectral data delivered from the detector (8) accordingly, by converting the measured times of flight to corrected times of flight and then converting these values to masses or charge-related masses m/z in accordance with a predetermined mass calibration. An example of the time-of-flight correction values is shown in FIG. 2 with the plotting of the time difference Δt in nanoseconds as a function of the measured time of flight for different sample material locations in the z-direction (in this case 25, 50, 75 and 100 micrometers of deviation from a zero position $t_{0\ \mu m}$). The points on the y-axis for the zero value indicate the fact that no time-of-flight correction value is needed for an optimal pulse focal position because the correction values are zero. The more the actual sample material location in the z-direction deviates from this zero position, the larger the time-of-flight correction values will be, e.g. a ~6 nanosecond correction for a z-direction position of 50 micrometers at a measured time of flight of around 68000 nanoseconds (=68 microseconds) or a ~12 nanosecond correction for a z-direction position of 75 micrometers at a measured time of flight of around 94000 nanoseconds (=94 microseconds). The parameters for the best-fit lines in the measured reference points, which were detected using a Bruker rapifleX®, are specified.

It is also possible to add reference molecules to the sample material, e.g. as an admixture of the matrix substance for the MALDI method in order to use the ionic species resulting from these reference molecules for a real-time calibration of the recorded spectral data. This procedure is also referred to as the lock-mass method. It is possible to use ionic species of the matrix substance as reference molecules, e.g. with the inclusion of dimers, trimers or even higher polymers of the matrix substance.

Figure 3:
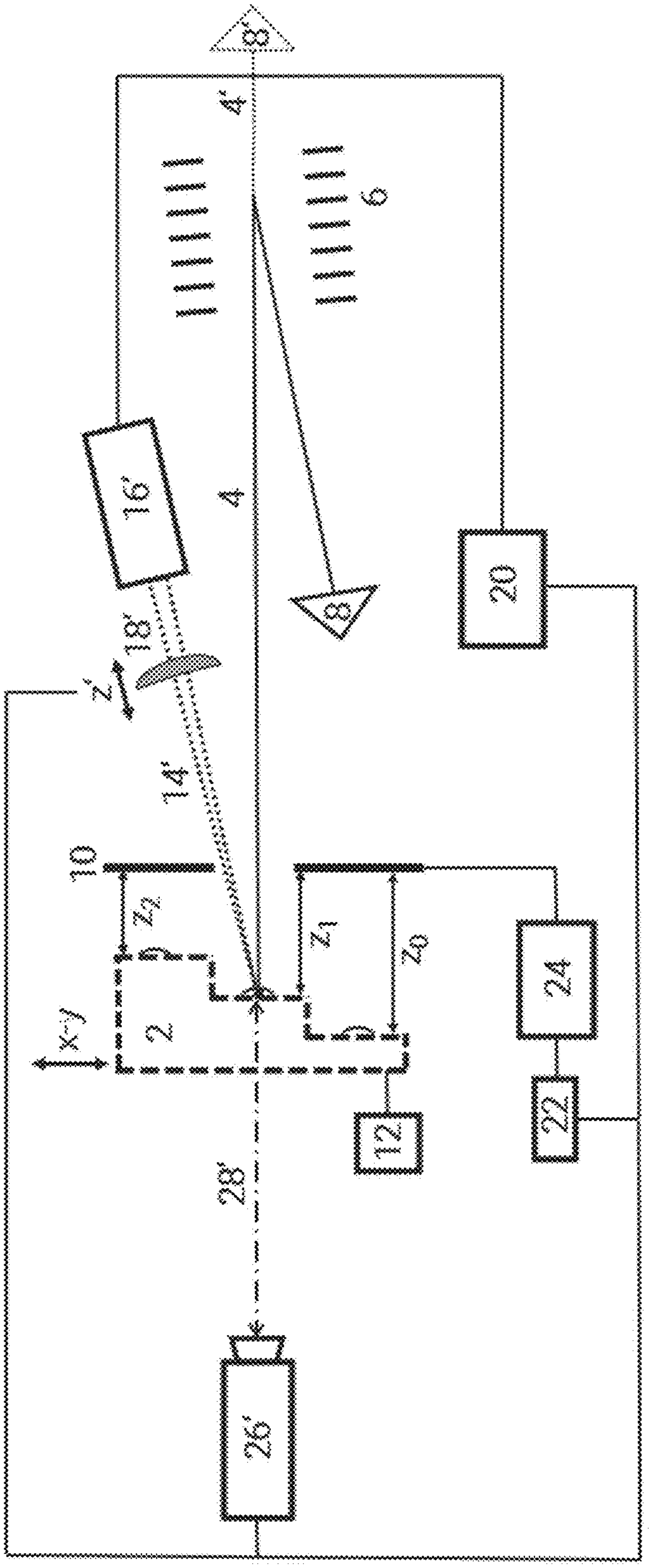
FIG. 3 is a schematic representation of an additional arrangement of a device for the spectrometric analysis of sample material located on a sample support, in accordance with principles of the present disclosure (reflection mode arrangement).

FIG. 3 shows a further arrangement of a device for the spectrometric analysis of sample material located on a sample support (2), and also depicts how a sample material location in a z-direction can be detected and how a pulse focal position can be adapted to the detected sample material location in the z-direction in order to bring about optimal ablation and/or desorption.

It shows an axial time-of-flight analyzer with an ionization device from which ionized sample material is pulsed, with a time lag, onto a flight path (4) that is deflected by a reflector (6) and therefore exhibits a non-rectilinear course before ending at a detector (8). A rectilinear variant of the flight path (4') is shown in dashed contour, where the detector (8') is directly opposite the ion-receiving side of an extraction electrode (10) and the sample support surface carrying the sample material. This type of time-of-flight analyzer design shortens the flight path (4') and reduces the time of flight accordingly, but can increase the ion detection sensitivity. As before, the ion formation area is located between the sample support (2), on which the sample material has been deposited, and the extraction electrode (10) with a central aperture, which can, by means of a control and/or guidance system, be pulsed onto an electrical potential that attracts the ablated and/or desorbed and ionized sample material. The extraction electrode (10) may also take the form of a more complex extraction electrode system. The sample support (2), which is shown stepped here too, is at least partially conductive and is connected to a voltage source (12) as a potential supply in order to receive an electrical reference potential.

A translation stage (not shown) to which the sample support (2) is coupled can be moved in an xy-plane in steps that go down to a few micrometers. A means of adjustment in the z-direction is optional, but not necessary within the context of the present disclosure. The dashed outline of the sample support (2) indicates that it is transparent for electromagnetic waves in order to allow the optical determination of the sample material location in the z-direction.

Figure 4:
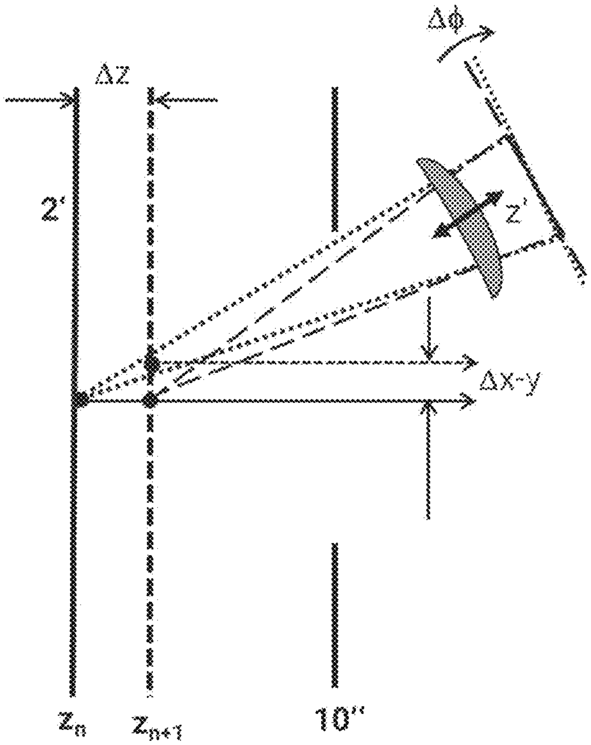
FIG. 4 illustrates a position and angle adaptation of a pulse focal position with a non-perpendicular incidence of a pulsed beam onto a sample support and the sample material (z ¥ z'), in accordance with principles of the present disclosure.

In the embodiment shown, the ionization device comprises a laser (16'), which can irradiate the pulses onto the sample support (2) in incident light at an angle to a surface normal. The laser (16') may be, for example, a nitrogen gas laser or Nd:YAG laser with frequency multiplication to the ultraviolet spectral range. An imaging lens (18') or a lens system in the beam path (14') can be moved along the direction of the pulse incidence onto the sample support (2) using a suitable mechanism, thereby adjusting the object distance and the image plane so that a pulse focus can be set to different points along the z-axis. It is important to take into account that a non-perpendicular incidence direction of the beam pulse (14') will mean that merely moving the lens to change the pulse focal position will also bring about a lateral displacement (Δx-y) of the pulse focus on the sample support (2), i.e. in the xy-plane. This displacement can, however, be derived from basic geometric principles, and can be easily corrected, for example by means of an angular deflection (Δϕ) using a pair of fast-actuating micromirrors (not shown) through which the laser pulse passes on its beam path (14'), as shown concisely in FIG. 4.

As before, a control and/or guidance system can be organized centrally in a single computer or locally using different circuits or processors coupled together. The control and/or guidance system in the present disclosure comprises a trigger generator (20) for the temporally coordinated release of laser pulses, a delay generator (22) and an electronic circuit (24) for generating an electrical extraction pulse, which can also take the form of a temporally varying potential profile, for example in order to take account of the acceleration behavior of ionic species with different masses.

In an area behind the sample support (2), away from the ion-optical setups such as the extraction device and flight tube, in which the flight path (4, 4') is located, a probing device in the form of an optical microscope (26') is positioned. The optical microscope (26') contains a light source that can illuminate the back of the sample support in incident light. The observation axis (28') of the optical microscope (26') runs perpendicular to the back of the sample support, and is therefore optically insensitive to purely lateral movements of the sample support (2) along or parallel to the xy-plane, as may be performed by the translation stage (not shown). An image capture system of the optical microscope (26') is arranged and designed for determining the position of maximum contrast along the z-direction or the extraction axis. For this purpose, a focus stacking method can be used, in which different object distances in the z-direction are set, e.g. by adjusting an objective lens in the optical microscope (26'), and the setting with the greatest image contrast can be determined as a function of the position in the z-direction.

A possible operational sequence can look like this: the translation stage (not shown) moves the sample support (2) to a certain position in the xy-plane so that a certain part of the sample material lies on the extraction axis. In the present example, it may be the reference position $z_1$, which has a central distance to the extraction electrode (10), compared to the positions $z_0$ and $z_2$. The light source of the optical microscope (26') illuminates the sample material and the sample support (2) from the back, and applies a focus stacking method in order to determine the maximum contrast in this position. If the determined maximum contrast corresponds to the standard position in the z-direction, for which the acceleration with time lag setting is optimal, and for which there is no need for any correction of the times of flight, the pulse focal position does not need to be adjusted and the laser pulse at the time of ablation and/or desorption and the delayed downstream electrical extraction pulse can be triggered by the trigger generator (20) or the delay generator (22). If, however, a deviation from the standard position in the z-direction is detected, as is for example the case on the stepped sample support (2) with distances $z_0$ and $z_2$ in relation to $z_1$, adaptation commands are generated and transmitted to the movement mechanism for the imaging lens (18') and the micromirrors (not shown) in the beam path (14') of the laser (16') so that the lens (18') is moved into a position and the pulse focal position adapted such that the area of the lowest lateral spread of the pulse in the z-direction is at the location of the determined sample material location in the z-direction, taking into account the lateral correction in the xy-plane by the corresponding optical system e.g. micromirror, see FIG. 4.

At the same time, the current sample material location in the z-direction is transmitted to the delay generator (22), which then selects a setting for acceleration with time lag that best corresponds to the determined sample material location. This can be done by selecting the most closely matching time lag value from a reference table. Alternatively, a time lag can also be calculated in real time from the reference points set out in a reference table, e.g. by interpolation, extrapolation, or regression. Alternatively, the dependency of the time lag on the sample material location in the z-direction can be stored as an equation in a control and/or guidance system processor and used to derive the time lag to be applied after applying or entering the determined sample material location in the z-direction. When the adjustment of the pulse focal position is complete and the corresponding setting for the acceleration with time lag has been set up in the circuit (24) for applying the extraction potential, the laser pulse and the electrical extraction pulse that follows with a time lag can be triggered.

Figure 5B:
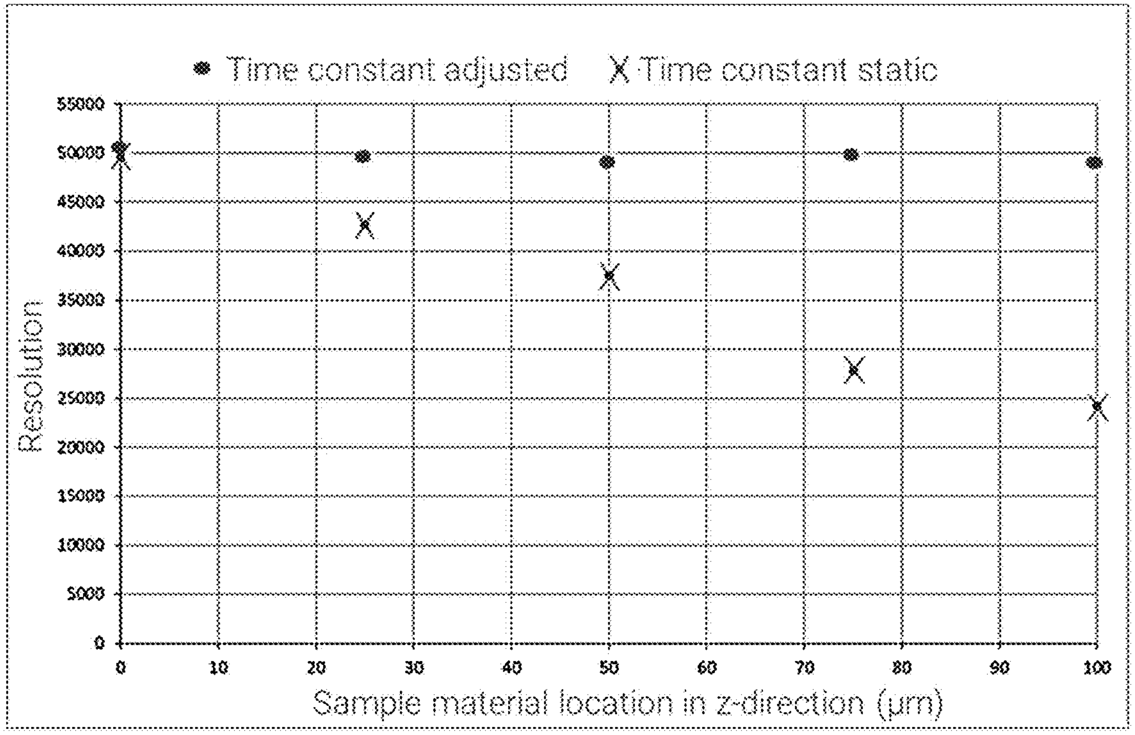
FIG. 5B shows a diagram in which the mass resolving power is plotted against a sample material location in the z-direction, both with application of the principles of the present disclosure and (for reference) with a static setting.
Figure 5A:
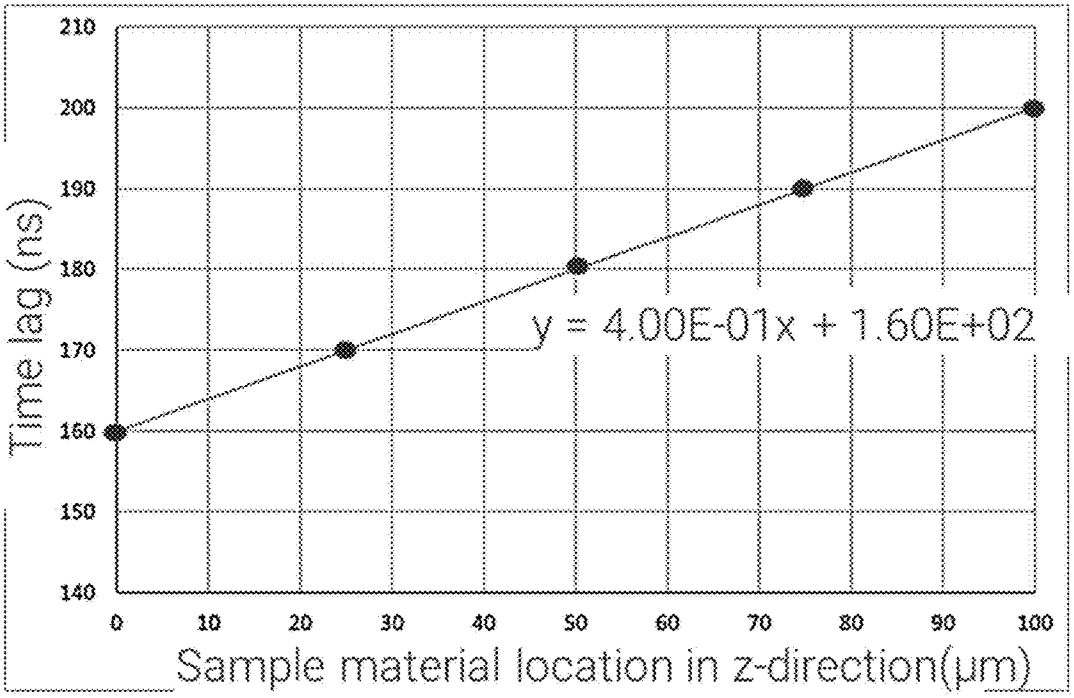
FIG. 5A shows a diagram in which an optimal time lag for acceleration with time lag is plotted against a sample material location in the z-direction.

FIG. 5A shows an experimentally determined dependency of the time lag of the delayed acceleration on a determined sample material location in the z-direction, on the basis that the mass resolution is to stay largely constant despite a changed sample material location. The investigated range for the sample material location in the z-direction was 0-100 micrometers, where 0 micrometers represents the largest possible distance from an extraction electrode, as shown as $z_0$ in FIG. 1, for example, and where 100 micrometers represents a significantly smaller distance from the extraction electrode, as shown as $z_2$ in FIG. 1. The observed mass is m/z 3147. The time lag changes from ~160 nanoseconds to ~200 nanoseconds between the two extreme positions, and behaves in a stable linear fashion, which allows parameterization with a best-fit line, whose parameters are given in the figure.

FIG. 5B shows the impact on the adjustment of the time lag on the sample material location in the z-direction and on the mass resolution compared to a scenario in which a static time lag is used for the delayed acceleration. The adjustment allows a stable high mass resolution of ~50,000, whereas the static setting by means of a stroke setting in the z-direction leads to a reduction to around half the mass resolution (~25,000). These results, which were obtained from the measured data from a Bruker rapifleX®, which schematically corresponds to the set-up shown in FIG. 3, confirm the benefit brought about by the principles of the present invention for axial time-of-flight analysis.

The invention has been described above with reference to different, specific example embodiments. It is to be understood, however, that various aspects or details of the embodiments described can be modified without deviating from the scope of the invention. Furthermore, the features and measures disclosed in connection with different embodiments can be combined as desired if this appears practicable to a person skilled in the art. Moreover, the above description serves only as an illustration of the invention and not as a limitation of the scope of protection, which is exclusively defined by the appended Claims, taking into account any equivalents which may exist.

The invention claimed is:

1. A device for the spectrometric analysis of sample material located on a sample support, comprising:
- an axial time-of-flight analyzer with a flight path emanating from the sample support,
- an ionization device that is arranged and designed to locally impact sample material on the sample support using ablation and/or desorption pulses, to ionize locally ablated and/or desorbed sample material and to adapt a pulse focal position along a z-direction that is substantially perpendicular to a tangential plane on an impingement point of an ablation and/or desorption pulse at the sample support, as a function of a sample material location in the z-direction,
- an extraction device that is arranged and designed to accelerate ionized sample material onto the flight path with a time lag, where the acceleration with time lag is coordinated with an ablation and/or desorption pulse and is performed using a setting that can be selected from a plurality of different settings that are designed for a plurality of predetermined sample material locations in the z-direction,
- a probing device that is arranged and designed to determine a sample material location in the z-direction for an impingement point of an upcoming ablation and/or desorption pulse, and
- a control and/or guidance system that communicates with the axial time-of-flight analyzer, the ionization device, the extraction device and the probing device and that is arranged and designed to control the ionization device in such a way that the focal position along the z-direction of the upcoming ablation and/or desorption pulse is adapted to the determined sample material location in the z-direction and further to control the extraction device in such a way that the determined sample material location in the z-direction is used to select a setting for the acceleration with time lag that follows the upcoming ablation and/or desorption pulse.

2. The device according to claim 1, wherein the plurality of settings comprises a corresponding plurality of time lags for the acceleration with time lag.

3. The device according to claim 2, wherein the plurality of time lags is allocated to discrete sample material locations in the z-direction in a reference table.

4. The device according to claim 2, wherein the plurality of time lags is recorded in a nanosecond grid containing intervals which are selected from among a group including: eight nanoseconds, six nanoseconds, four nanoseconds, two nanoseconds, one nanosecond.

5. The device according to claim 2, wherein the plurality of settings is parameterized in an equation as a function of the determined sample material location in the z-direction.

6. The device according to claim 5, wherein the equation is parameterized linearly, in accordance with: Time lag t (height h)=a*h+b, where h is a relative reference sample material location in the z-direction at the ablation and/or desorption location, and a and b are constants of a regression from calibration data.

7. The device according to claim 1, wherein the control and/or guidance system is arranged and designed to convert times of flight to masses m or mass-related values, e.g. m/z, using time-of-flight correction values that can be selected from a plurality of time-of-flight correction values designed for a plurality of predetermined sample material locations in the z-direction.

8. The device according to claim 7, wherein a time-of-flight correction value is selected for the conversion using the determined sample material location in the z-direction.

9. The device according to claim 1, wherein the time-of-flight analyzer is arranged and designed with a rectilinear flight path or curved flight path, e.g. using at least one reflector.

10. The device according to claim 1, wherein the ionization device is arranged and designed to impact the sample material in transmission mode through the sample support, or in reflection mode with ablation and/or desorption pulses.

11. A method for the spectrometric analysis of sample material located on a sample support, the method comprising the following steps:
- determining, using a probing device, a sample material location in a z-direction for an impingement point of an upcoming ablation and/or desorption pulse on the sample support, wherein the z-direction is substantially perpendicular to a tangential plane on the impingement point;
- adapting a pulse focal position of an ionization device along the z-direction for the upcoming ablation and/or desorption pulse to the determined sample material location in the z-direction;
- selecting a setting for an acceleration with time lag from a plurality of different settings designed for a plurality of predetermined sample material locations in the z-direction, wherein the setting is selected using the determined sample material location in the z-direction;
- locally impacting the sample material on the sample support with the upcoming ablation and/or desorption pulse using the adapted pulse focal position to ionize locally ablated and/or desorbed sample material; and
- accelerating the ionized sample material onto a flight path of an axial time-of-flight analyzer using the selected setting for the acceleration with time lag.

* * * * *